United States Patent [19]
Cass et al.

[11] Patent Number: 5,780,965
[45] Date of Patent: Jul. 14, 1998

[54] THREE DIMENSIONAL ELECTROLUMINESCENT DISPLAY

[75] Inventors: Michael W. Cass, Lenox, Mich.; Rodney T. Eckersley, Tempe, Ariz.; Robert J. Krafcik; Walter J. Paciorek, both of Phoenix, Ariz.; Ramona R. Fechter, West Bend, Wis.

[73] Assignee: Key Plastics, Inc., Novi, Mich.

[21] Appl. No.: 164,142

[22] Filed: Dec. 9, 1993

[51] Int. Cl.⁶ .................................................. H05B 33/00
[52] U.S. Cl. ........................... 313/506; 313/512; 313/509; 313/510
[58] Field of Search ................................. 313/498, 506, 313/509, 510, 511, 512, 478

[56] References Cited

U.S. PATENT DOCUMENTS

| | | |
|---|---|---|
| 2,867,739 | 1/1959 | Michlin . |
| 2,975,318 | 3/1961 | Nicoll . |
| 3,182,415 | 5/1965 | Brooks . |
| 3,670,067 | 6/1972 | Coolbaugh et al. . |
| 3,680,237 | 8/1972 | Finnerty, Sr. . |
| 3,680,239 | 8/1972 | Andrews . |
| 4,138,620 | 2/1979 | Dickson . |
| 4,195,431 | 4/1980 | Neufeld . |
| 4,208,869 | 6/1980 | Hanaoka . |
| 4,275,403 | 6/1981 | Lebailly . |
| 4,457,089 | 7/1984 | Phillips, Jr. . |
| 4,494,326 | 1/1985 | Kanamori . |
| 4,578,617 | 3/1986 | Kerr, III et al. . |
| 4,593,228 | 6/1986 | Albrechtson et al. . |
| 4,603,065 | 7/1986 | Mori et al. . |
| 4,645,970 | 2/1987 | Murphy . |
| 4,721,883 | 1/1988 | Jacobs et al. . |
| 4,788,629 | 11/1988 | Handy et al. . |
| 5,005,306 | 4/1991 | Kinstler . |
| 5,051,654 | 9/1991 | Nativi et al. . |
| 5,068,157 | 11/1991 | Wou .......................... 313/512 |
| 5,107,175 | 4/1992 | Hivano et al. ............... 313/512 |
| 5,116,270 | 5/1992 | Aizawa et al. . |
| 5,122,709 | 6/1992 | Kawamura et al. ............ 313/478 |
| 5,131,877 | 7/1992 | Mathumoto . |
| 5,184,969 | 2/1993 | Sharpless et al. . |
| 5,317,488 | 5/1994 | Penrod . |

FOREIGN PATENT DOCUMENTS

| | | |
|---|---|---|
| 0368450 | 9/1989 | European Pat. Off. . |
| 1365333 | 8/1974 | United Kingdom . |
| 2217527 | 10/1989 | United Kingdom . |
| 2230638 | 10/1990 | United Kingdom . |
| 2233139 | 1/1991 | United Kingdom . |

*Primary Examiner*—Nimeshkumar Patel
*Attorney, Agent, or Firm*—Bliss McGlynn, P.C.

[57] ABSTRACT

A three dimensional electroluminescent display includes a transparent sheet, a translucent layer placed on the transparent sheet, at least one electroluminescent (EL) lamp placed adjacent the translucent layer, and a substrate molded to the EL lamp and transparent sheet to form an integral, molded three dimensional EL display and a method of making the same.

14 Claims, 3 Drawing Sheets

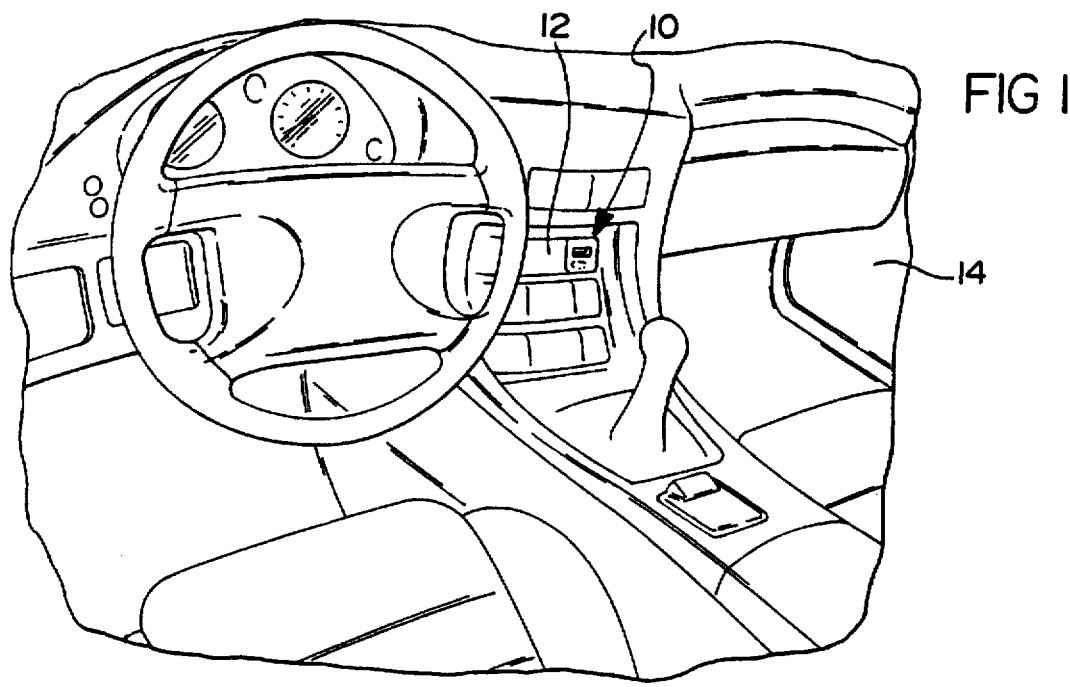
FIG 1
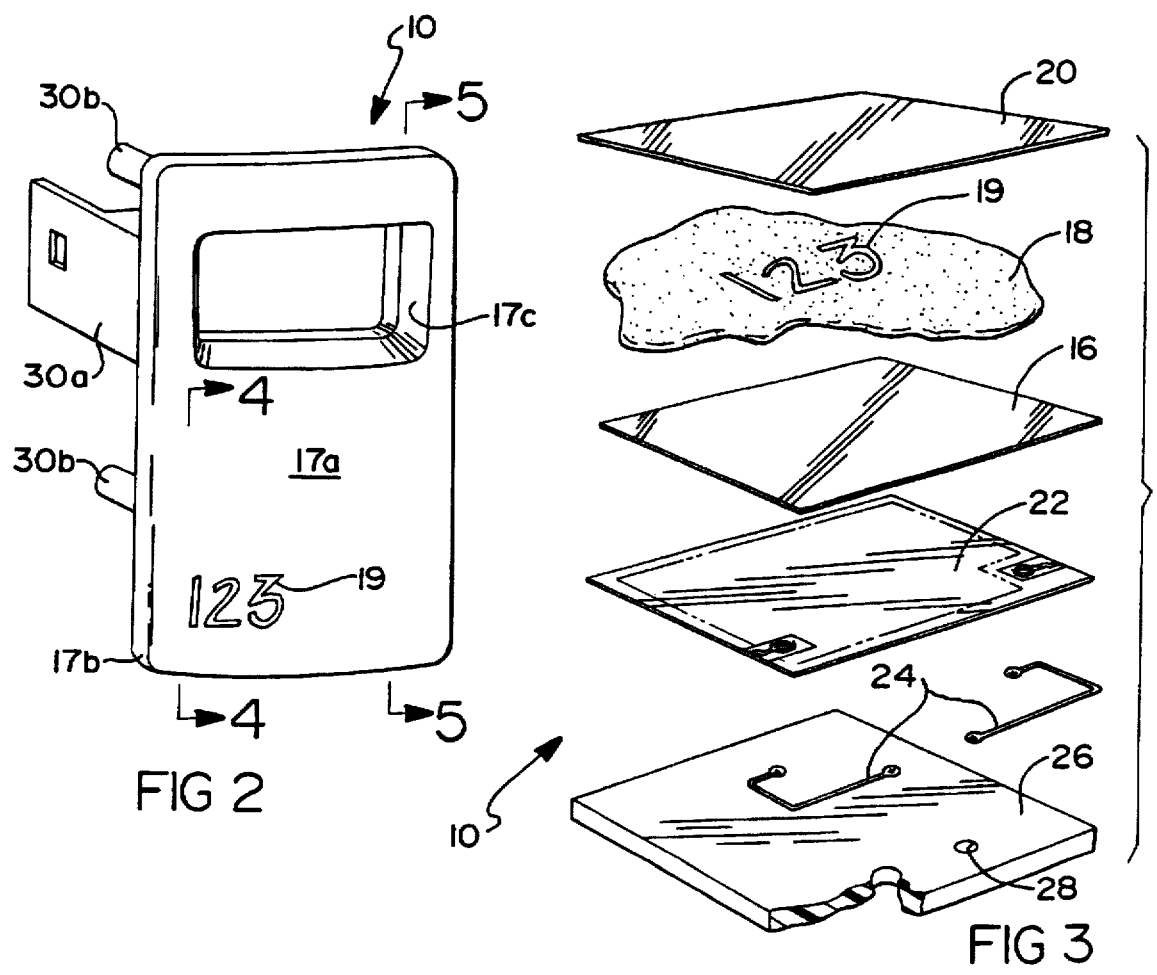
FIG 2
FIG 3

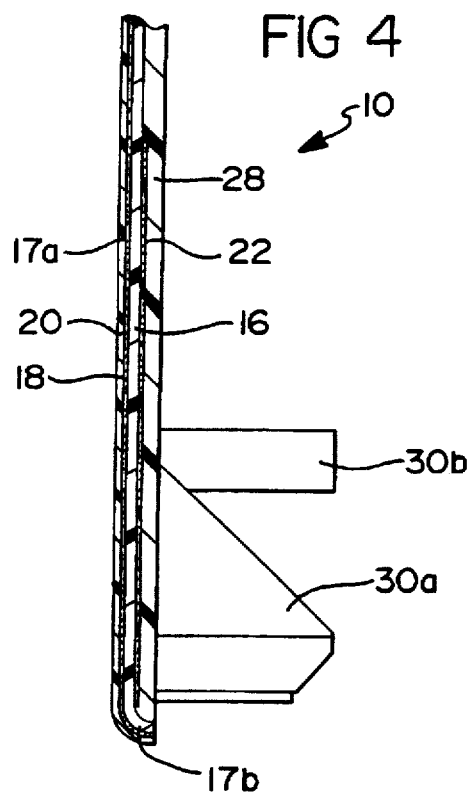
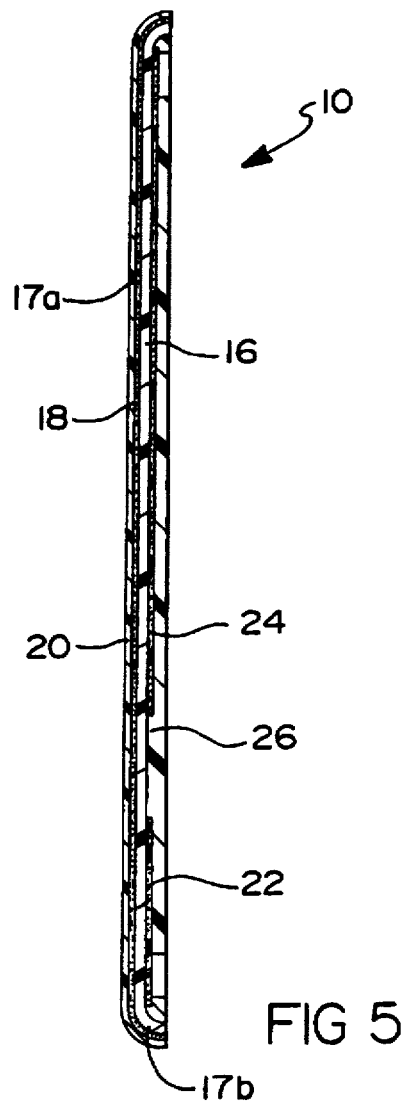

THREE DIMENSIONAL ELECTROLUMINESCENT DISPLAY

BACKGROUND OF THE INVENTION

1. Field of the Invention

The present invention relates generally to luminous displays and, more particularly to, a three dimensional electroluminescent display.

2. Description of the Related Art

It is known to provide backlighting for a display e.g., panels having an opaque mask to produce a luminous graphic such as designs, symbols, and alphanumerical characters. Typically, the display is flat or planar. An incandescent lamp is placed behind and spaced from the display and connected to a source of power. The source of power causes the incandescent lamp to illuminate the graphics on the display.

One problem with incandescent backlighting is that, on non-planar surfaces, the intensity of the incandescent lamp does not evenly or uniformly illuminate the graphics. Another problem with incandescent backlighting is that the incandescent lamps burn out and have to be replaced.

It is also known to provide an electroluminescent (EL) lamp for backlighting displays. An EL lamp is essentially a capacitor having a dielectric layer between two conductive electrodes, one of which is transparent. The dielectric layer includes a phosphor powder which radiates light in the presence of a strong electric field, using small amounts of current. The front electrode is typically a thin, transparent layer of indium tin oxide or indium oxide and the rear electrode is typically a polymer binder, e.g. polyvinylidene fluoride (PVDF), polyester, vinyl, or epoxy, containing conductive particles such as silver or carbon. The front electrode is applied to a polymer film such as polyester or polycarbonate to provide mechanical integrity and support for other layers.

One problem with electroluminescent backlighting is that it is difficult to achieve a background having uniform brightness if the EL lamp is separated from the graphic or spaced from an outer surface of the display by a short distance, e.g., a distance equal to a few tenths of the width of the EL lamp. The display appears brighter at the center than at the edges. This is due in part to light scattering in the space separating the EL lamp from the graphic. If the EL lamp is recessed farther from the graphic, the light becomes collimated, i.e., uniformity is improved but the EL lamp appears to be less bright. To recapture the scattered light, it is necessary to construct a reflecting surface that encloses the space between the EL lamp and the graphic. Therefore, there is a need in the art to merge an EL lamp and a graphic at the outer surface of a display to obtain maximum brightness and uniformity.

Another problem of the EL backlighting is that the EL lamps are typically planar strips for planar surfaces and makes it difficult to produce luminous curved or contoured surfaces. Although some EL lamps can be bent into a three dimensional shape, the radius of curvature must be greater than 0.25 inches (0.64 cm) to avoid breaking the front electrode or other layers in the lamp. EL lamps made from polychloro-trifluoro-ethylene tend to delaminate when subjected to thermal or mechanical stress. If a shape includes a radius of curvature less than 0.25 inches, it is preferable to use two or more EL lamps connected by a flexible substrate. Therefore, there is a need in the art for a three dimensional display using an EL lamp to provide all surfaces (planar and curved) of uniform luminosity.

SUMMARY OF THE INVENTION

It is, therefore, one object of the present invention to provide a three dimensional electroluminescent display.

It is another object of the present invention to provide a luminous, three dimensional display having a molded, integral electroluminescent lamp.

It is yet another object of the present invention to provide a three dimensional electroluminescent display in which curved or contoured surfaces are luminous.

It is a further object of the present invention to provide a molded, integral three dimensional display having an electroluminescent lamp and a graphic at an outer surface of the display to obtain maximum brightness and uniformity of lighting.

It is a still further object of the present invention to provide a three dimensional electroluminescent display having selectively deposited EL phosphor for producing a luminous graphic.

It is yet another object of the present invention to provide a three dimensional electroluminescent display using fewer components and occupying less space than conventional displays.

To achieve the foregoing objects, the present invention is a three dimensional electroluminescent display including a transparent sheet and a translucent layer disposed on at least one side of the transparent sheet. The three dimensional electroluminescent display also includes at least one electroluminescent (EL) lamp disposed adjacent the translucent layer and a substrate molded to the EL lamp and transparent sheet to form an integral, three dimensional EL display.

Also, the present invention is a method of making a three dimensional electroluminescent display including the steps of providing a sheet of a transparent material and placing a translucent layer on at least one side of the sheet. The method further includes the steps of placing at least one EL lamp adjacent the translucent layer and molding a substrate to the EL lamp and the sheet and forming an integral, three dimensional EL display.

One feature of the present invention is that a luminous three dimensional display is provided. Another feature of the present invention is that the three dimensional electroluminescent display has a molded, integral EL lamp merged at an outer surface of the display to obtain maximum brightness and uniform luminosity. Yet another feature of the present invention is that the three dimensional electroluminescent display has a molded substrate to support an EL lamp in a three dimensional shape in which curved or contoured surfaces are luminous. Still another feature of the present invention is that the three dimensional electroluminescent display uses selectively deposited EL lamps which are less expensive than conventional EL lamps where the phosphor powder is deposited or printed on the entire surface of the part. A further feature of the present invention is that the three dimensional electroluminescent display has fewer components and less space consumption than conventional incandescent lamp constructions, i.e., there is no need for a circuit board to mount the incandescent lamp and the EL lamp is much thinner than the incandescent lamp. Yet a further feature of the present invention is that the three dimensional electroluminescent display is cooler compared to conventional incandescent lamps which generate heat and has better serviceability for consumers compared to disassembling many components to replace either an incandescent lamp or a flat EL lamp mounted to another substrate or component. A still further feature of the present invention is that the three dimensional electroluminescent display is capable of maximizing brightness of the display, thus driving the need for less energy to activate the EL lamp, which will also increase the life of the EL lamp.

Other objects, features and advantages of the present invention will be readily appreciated as the same becomes better understood after reading the subsequent description taken in conjunction with the accompanying drawings.

BRIEF DESCRIPTION OF THE DRAWINGS

FIG. 1 is a perspective view of a three dimensional electroluminescent display, according to the present invention, illustrated in operational relationship with an occupant compartment of an automotive vehicle.

FIG. 2 is a perspective view of the three dimensional electroluminescent display of FIG. 1.

FIG. 3 is an exploded perspective view of the three dimensional electroluminescent display of FIGS. 1 and 2.

FIG. 4 is a sectional view taken along lines 4—4 of FIG. 2.

FIG. 5 is a sectional view taken along lines 5—5 of FIG. 2.

DESCRIPTION OF THE PREFERRED EMBODIMENT(S)

Figure 6:
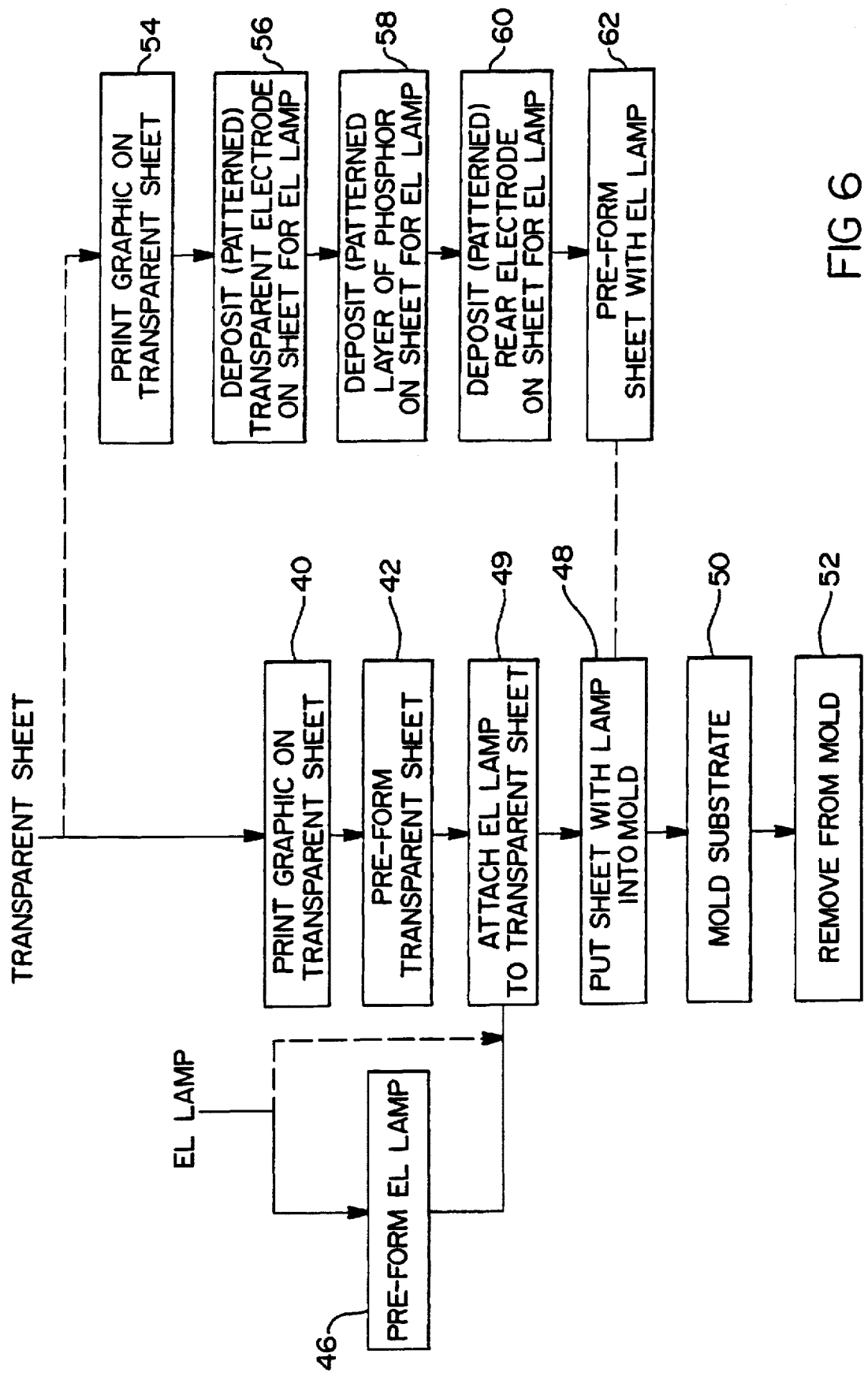
FIG. 6 is a flowchart of methods of making a three dimensional electroluminescent display of FIG. 1 according to the present invention.

Referring to FIG. 1, a three dimensional electroluminescent display 10, according to the present invention, is illustrated in operational relationship with an instrument panel 12 of an occupant compartment 14 of an automotive vehicle. The three dimensional electroluminescent display 10 provides a luminous display on the instrument panel 12 in the occupant compartment 14.

Referring to FIGS. 2 through 5, the three dimensional electroluminescent display 10 includes an applique or sheet 16 which is transparent. The sheet 16 is a clear film of a plastic material such as polycarbonate. The sheet 16 is preformed such that it may have a curved outer surface 17a with rounded corners 17b and an aperture 17c extending therethrough to receive a switch (not shown). It should be appreciated that the sheet 16 may be planar and formed subsequently as will be described.

The three dimensional electroluminescent display 10 also includes a first or translucent layer 18 disposed on one side of the sheet 16 to form graphics 19 such as "123". The translucent layer 18 is printed onto the sheet 16 by suitable means such as silkscreening, offset lithography, screen printing, rotary letter pressing, gravure printing or flexography which are all conventional and known in the art. The translucent layer 18 may be a multiple colored semi-transparent artwork. In the embodiment, the translucent layer 18 has a first ink silkscreened onto the sheet 16 to configure the graphics 19 with "123". A second ink may be silkscreened on the other side of the sheet 16 to form opaque graphics 19. It should be appreciated that the translucent layer 18 is printed to form windows configuring the graphics 19. It should also be appreciated that the translucent layer 18 may be placed on either side or both sides of the sheet 16.

The three dimensional electroluminescent display 10 may include a second or protective layer 20 placed over the translucent layer 18. The protective layer 20 is a topcoat of a clear, hard resin such as polyurethane or acrylate polyurethanes. The protective layer 20 is printed over the translucent layer 18 by suitable means such as silkscreening or spraying as previously described. It should be appreciated that the protective layer 20 protects the translucent layer 18 from abrasions.

The three dimensional electroluminescent display 10 includes at least one EL lamp 22 disposed directly behind or in intimate contact with the sheet 16 or, alternatively, behind the translucent layer 18. The EL lamp 22 is disposed behind the graphics 19 and secured to the sheet 16 by suitable means such as adhesives or laminates, e.g., pressure sensitive or chemically bonded adhesion promoters or deposited directly onto the sheet 16. The EL lamp 22 is pre-formed prior to attachment to the sheet 16. It should be appreciated that the EL lamp 22 may be planar and formed subsequently as will be described. It should also be appreciated that the EL lamp 22 emits photons of visible light when a voltage is applied.

The three dimensional electroluminescent display 10 also includes a plurality of conductive leads 24 which are connected to the EL lamp 22. The conductive leads 24 are made from a conductive material such as copper and may be produced with a stamping die and process as is known in the art. Alternatively, the conductive leads 24 may be screened conductive ink tracings leading from the connector positive/negative leads extending to each EL lamp 22. It should be appreciated that a plurality of EL lamps 22 may be used to allow selective addressing of several EL lamps 22 using conductive leads 24 as described above which allows EL lamps in sharp corners.

The three dimensional electroluminescent display 10 further includes a substrate 26 to provide a three dimensional shape for the sheet 16. Preferably, the substrate 26 is a plastic material. The sheet 16 with the EL lamp 22 may be formed (if not preformed) by conventional methods and inserted into a mold (not shown) in an injection molding machine (not shown) to inject the plastic material into the mold behind the sheet 16 and form the substrate 26 to which the EL lamp 22 adheres. Alternatively, the conductive leads 24 and sheet 16 with the EL lamp 22 may be inserted into the mold and the plastic material injected into the mold to form the substrate 26 and bind the conductive leads 24, EL lamp 22 and sheet 16 together.

The molded substrate 26 has openings 28 for connection to a standard connector (not shown) with spring loaded pins (not shown) that are disposed in the openings 28 for connection to an electrical current source (not shown). In the embodiment, the electrical current source is an inverter within the automotive vehicle. The substrate 28 may also have projections 30a and 30b for connection to the instrument panel 12. It should be appreciated that the EL lamp 22 and substrate 26 are bonded together into an integral unit and the EL lamp 22 conforms to the three dimensional shape of the substrate 26.

In operation, the electrical current source provides voltage through the conductive leads 24 and to the EL lamp 22. The electric field excites the phosphors of the EL lamp 22 and photons are emitted with almost all of the radiant energy lying within the visible light spectrum. The visible light passes through the graphics 19 to make the "123" luminous in the occupant compartment 14.

Alternatively, the layers of the EL lamp 22 may be screen printed onto the second surface of the translucent layer 18 or sheet 16, or the translucent layer 18 may be printed on the front electrode of the EL lamp 22 such as by silk-screening. Also, the conductive leads 24 may be printed on the EL lamp 22 such as by silk-screening. It should be appreciated that the graphics 19 are produced prior to molding by patterning an electrode of the EL lamp 22, by screen printing onto a front or first surface of the EL lamp 22, or by screen printing onto a separate sheet 16.

Additionally, the three dimensional electroluminescent display 10 is made by a method according to the present invention. The method includes the steps of providing the sheet 16 of a transparent material and placing the translucent layer 18 on at least one side of the sheet 16. The method further includes the steps of placing at least one EL lamp 22 adjacent the translucent layer 18 and molding the substrate 26 to the EL lamp 22 and the sheet 16 and forming the integral, three dimensional display 10.

Referring to FIG. 6, specific methods of making the three dimensional electroluminescent display 10 are illustrated. The first method includes providing the sheet 16 and printing the translucent layer 18 having graphics 19 on the sheet 16 in box 40 and pre-forming the sheet 16 in box 42. The first method also includes attaching or securing at least one EL lamp 22 to the sheet 16 in box 44. As illustrated in box 46, the EL lamp 22 may be pre-formed prior to attachment to the sheet 16. It should also be appreciated that box 42 is optional and the sheet 16 and EL lamp 22 formed after box 44.

After box 44, the first method includes putting or placing the sheet 16 with the EL lamp 22 into the mold in box 48, molding the substrate 26 to the EL lamp 22 and sheet 16 in box 50, and removing the three dimensional electroluminescent display 10 from the mold in box 52.

Alternatively, a second method includes providing the sheet 16 and printing the translucent layer 18 having graphics 19 on the sheet 16 in box 54. After box 54, the second method includes depositing (patterned) transparent electrode of at least one EL lamp 22 on the sheet 16 in box 56, depositing (patterned) layer of phosphor of the EL lamp 22 on the sheet 16 in box 58, and depositing (patterned) rear electrode of the EL lamp 22 on the sheet 16 in box 60. After box 60, the second method includes pre-forming the sheet 16 with at least one EL lamp 22 in box 62 and performs the steps in boxes 48, 50 and 52 previously described.

Accordingly, the present invention provides a luminous three dimensional display 10 having maximum brightness and uniformity. The three dimensional electroluminescent display 10 provides even contact of the EL lamp 22 against the sheet 16. The three dimensional electroluminescent display 10 also provides a substrate 26 which is molded to the EL lamp 22 and sheet 16 and protects the EL lamp 22 from mechanical damage and simplifies assembly. The three dimensional electroluminescent display 10 may provide graphics 19 at different levels and the intimate contact between the EL lamp 22 and graphics 19 provides uniform luminosity. The three dimensional electroluminescent display 10 can be used for decorative lighting or with graphics, for providing useful or necessary information to a viewer. Several colors can be combined in a single display and portions of a display can be selectively activated to further enhance the effectiveness of the display. The three dimensional electroluminescent display 10 may be used in the instrument panel 12 of an automotive vehicle and provide immunity to shock and longer service life of the EL lamp 22 in the vehicle as compared to conventional incandescent lamps.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A three dimensional electroluminescent display comprising:
   a transparent sheet;
   a translucent layer placed on at least one side of said sheet;
   at least one electroluminescent (EL) lamp placed directly behind said translucent layer and covering at least a portion on one side of said sheet; and
   a substrate molded to said EL lamp and said sheet on the one side thereof to form an integral, three dimensional EL display having a curved and contoured outer surface.

2. A three dimensional electroluminescent display as set forth in claim 1 wherein said at least one EL lamp and said sheet are pre-formed.

3. A three dimensional electroluminescent display as set forth in claim 1 wherein said translucent layer is an ink material printed on said sheet.

4. A three dimensional electroluminescent display as set forth in claim 1 including a plurality of conductive leads connected to said at least one EL lamp.

5. A three dimensional electroluminescent display as set forth in claim 1 wherein said substrate is a plastic material molded to said sheet.

6. A three dimensional electroluminescent display as set forth in claim 1 including a protective layer placed over said translucent layer to protect said translucent layer from abrasions.

7. A three dimensional electroluminescent display comprising:
   a transparent sheet;
   a translucent layer placed on at least on side of said sheet having graphics;
   at least one electroluminescent (EL) lamp placed behind said graphics and covering at least a portion on one side of said sheet;
   a plurality of conductive leads connected lo said at least one EL lamp on the one side of said sheet; and
   a substrate molded to said at least one EL lamp and said conductive leads and said sheet on the one side thereof to form a three dimensional shape having a curved and contoured outer surface and bind said conductive leads and said at least one EL lamp and said sheet together.

8. A three dimensional electroluminescent display as set forth in claim 7 wherein said translucent layer is an ink material printed on said sheet.

9. A three dimensional electroluminescent display as set forth in claim 8 wherein said substrate is a plastic material molded to said sheet.

10. A three dimensional electroluminescent display comprising:
    a transparent sheet;
    a translucent layer of ink material printed on at least one side of said sheer having graphics;
    at least one electroluminescent (EL) lamp placed directly behind said graphics and covering at least a portion on one side of said sheet;
    a plurality of conductive leads connected to said at least one EL lamp;

a protective layer placed over said translucent layer to protect said translucent layer from abrasions; and a plastic material substrate molded to said at least one EL lamp and said conductive leads and said sheet on the one side thereof to form a three dimensional shape having a curved and contoured outer surface and bind said leads and said at least one EL lamp and said sheet together.

11. A three dimensional electroluminescent display comprising:

a transparent sheet;

a translucent layer placed on at least one side of said sheet;

at least one electroluminescent (EL) lamp placed behind said translucent layer and covering at least a portion on one side of said sheet; and a substrate molded to said EL lamp and said sheet on the one side thereof to support said EL lamp in a three dimensional shape having a curved and contoured outer surface.

12. A three dimensional electroluminescent display comprising:

a transparent sheet formed to a three dimensional shape;

a translucent layer placed on at least one side of said sheet;

at least one electroluminescent (EL) lamp placed behind said translucent layer and covering at least a portion on one side of said sheet; and a substrate molded to said EL lamp and said sheet on the one side thereof to form an integral, three dimensional EL display having a curved and contoured outer surface.

13. A three dimensional electroluminescent display comprising:

a transparent sheet;

a translucent layer placed on at least one side of said sheet;

at least one electroluminescent (EL) lamp placed behind said translucent layer and covering at least a portion on one side of and secured to said transparent sheet; and a substrate molded to said EL lamp and said sheet on the one side thereof to form an integral, three dimensional El display having a curved and contoured outer surface.

14. A three dimensional electroluminescent display comprising:

a transparent sheet;

a translucent layer placed on at least on side of said sheet;

a plurality of electroluminescent (EL) lamps selectively deposited adjacent said translucent layer and covering at least a portion on one side of said transparent sheet; and a substrate molded to said EL lamp and said sheet on the one side thereof to form an integral, three dimensional EL display having a curved and contoured outer surface.

* * * * *

UNITED STATES PATENT AND TRADEMARK OFFICE
CERTIFICATE OF CORRECTION

PATENT NO. : 5,780,965
DATED : July 14, 1998
INVENTOR(S) : Michael W. Cass et al.

It is certified that error appears in the above-indentified patent and that said Letters Patent is hereby corrected as shown below:

Column 6, line 44, delete "lo" and insert therefor --to--.

Column 6, line 63, delete "sheer" and insert therefor --sheet--.

Column 8, line 15, delete "El" and insert therefor --EL--.

Signed and Sealed this

Ninth Day of March, 1999

Attest:

Q. TODD DICKINSON

*Attesting Officer*    *Acting Commissioner of Patents and Trademarks*

(12) EX PARTE REEXAMINATION CERTIFICATE (5399th)
United States Patent
Cass et al.

(10) Number: US 5,780,965 C1
(45) Certificate Issued: Jun. 13, 2006

(54) THREE DIMENSIONAL ELECTROLUMINESCENT DISPLAY

(75) Inventors: Michael W. Cass, Lenox, MI (US); Rodney T. Eckersley, Tempe, AZ (US); Robert J. Krafcik, Phoenix, AZ (US); Walter J. Paciorek, Phoenix, AZ (US); Ramona R. Fechter, West Bend, WI (US)

(73) Assignee: Key Plastic, Inc., Novi, MI (US)

Reexamination Request:
No. 90/006,900, Jan. 5, 2004

Reexamination Certificate for:
Patent No.: 5,780,965
Issued: Jul. 14, 1998
Appl. No.: 08/164,142
Filed: Dec. 9, 1993

Certificate of Correction issued Mar. 9, 1999.

(51) Int. Cl.
*H05B 33/00* (2006.01)

(52) U.S. Cl. .................. 313/506; 313/509; 313/510
(58) Field of Classification Search ............ 313/498, 313/506, 509, 510–512, 478
See application file for complete search history.

(56) References Cited

U.S. PATENT DOCUMENTS

| 3,046,432 A | 7/1962 | Nehrich, Jr. |
| 3,344,269 A | 9/1967 | Brown |
| 4,603,065 A | 7/1986 | Mori et al. |
| 5,337,224 A | 8/1994 | Field et al. |

FOREIGN PATENT DOCUMENTS

| JP | 55-4953 | 2/1980 |
| JP | 58-164953 | 11/1983 |
| JP | 60-184698 | 12/1985 |
| JP | 63-171995 | 11/1988 |
| JP | 1-299016 | 12/1989 |
| JP | 5-72984 | 3/1993 |

*Primary Examiner*—Vip Patel

(57) ABSTRACT

A three dimensional electroluminescent display includes a transparent sheet, a translucent layer placed on the transparent sheet, at least one electroluminescent (EL) lamp placed adjacent the translucent layer, and a substrate molded to the EL lamp and transparent sheet to form an integral, molded three dimensional EL display and a method of making the same.

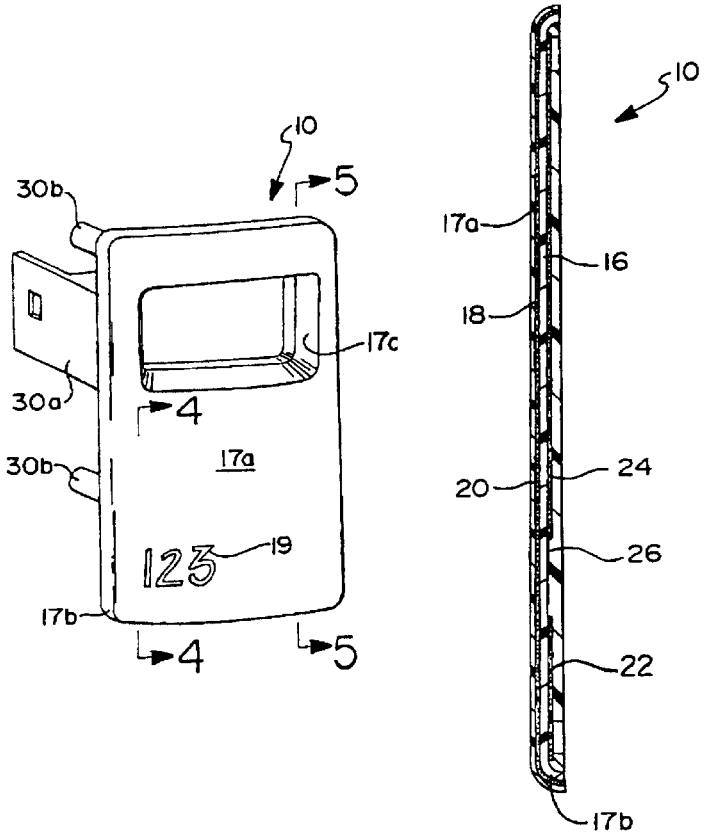

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–14 is confirmed.

New claims 15–17 are added and determined to be patentable.

*15. A three dimensional electroluminescent display comprising:*

*a transparent sheet formed to a three dimensional shape;*

*a translucent layer placed on at least one side of said sheet;*

*at least one eletroluminescent (EL) lamp placed behind said translucent layer and covering at least a portion on one side of said sheet; and*

*a substrate molded to said EL lamp and said sheet on the one side thereof to form an integral, three dimensional EL display having a curved and contoured outer surface, wherein said outer surface includes a curved central portion and corners contoured relative to said curved central portion.*

*16. A three dimensional electroluminescent display as set forth in claim 15 wherein said outer surface includes an aperture.*

*17. A three dimensional electroluminescent display as set forth in claim 15 wherein a curvature of said central portion is generally perpendicular to a curvature of at least one of said corners.*

* * * * *